(12) United States Patent
Klein et al.

(10) Patent No.: US 7,911,753 B2
(45) Date of Patent: Mar. 22, 2011

(54) METHOD AND APPARATUS FOR DETECTING AND RECOVERING FROM EXTERNAL ELECTRICAL DISTURBANCES

(75) Inventors: Christian Klein, Portland, ME (US); Seth Prentice, Auburn, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 199 days.

(21) Appl. No.: 12/370,974

(22) Filed: Feb. 13, 2009

(65) Prior Publication Data

US 2009/0213510 A1    Aug. 27, 2009

Related U.S. Application Data

(60) Provisional application No. 61/030,703, filed on Feb. 22, 2008.

(51) Int. Cl.
*H02H 3/00* (2006.01)
(52) U.S. Cl. .......................................... 361/59; 361/91.1
(58) Field of Classification Search ............ 361/56, 361/59, 91.1, 111
See application file for complete search history.

(56) References Cited

U.S. PATENT DOCUMENTS

| 6,259,371 | B1 * | 7/2001 | Chang .......................... 340/659 |
| 6,658,597 | B1 | 12/2003 | Ker et al. |
| 7,142,400 | B1 * | 11/2006 | Williams et al. ................. 361/18 |
| 2006/0222059 | A1 * | 10/2006 | Ruff et al. ..................... 375/219 |

* cited by examiner

*Primary Examiner* — Danny Nguyen
(74) *Attorney, Agent, or Firm* — Cesari and McKenna, LLP

(57) ABSTRACT

Apparatus and method are described, illustratively in an LVLS master/slave system, for detecting a circuit failure, shutting down the system as if a normal power down function has occurred, but restarting the system. Signals, including power and ground lines are monitors, mal-functions detected and the apparatus put into a power down sequence. Illustratively in the LVLS system, driving a signal line to either the power or ground rails is used as a signal to the apparatus to enter the power down sequence. The present invention, after a programmable time, then drives the signal line to the opposite rail thereby signaling the system to restart—a wake up mode. After a programmable time, the signal line is released and the system resumes normal operation.

7 Claims, 3 Drawing Sheets

METHOD AND APPARATUS FOR DETECTING AND RECOVERING FROM EXTERNAL ELECTRICAL DISTURBANCES

RELATED APPLICATIONS

The present application is related to and claims the benefit of the filing date of a provisional application filed Feb. 22, 2008, Ser. No. 61/030,703, the provisional application of common title, inventorship, and ownership. The provisional application is hereby incorporated herein by reference.

BACKGROUND OF THE INVENTION

1. Field of the Invention

The present invention relates to ESD (Electro-Static Discharge) events and other occurrences that cause electronic systems to fail; and more particularly to the detection of the failure and the recovery therefrom.

2. Background Information

Modern electronic circuitry is smaller, denser and susceptible to ESD events causing circuit failures. ESD events are often caused by charged human touching a circuit or by other power anomalies, e.g., lightning. Other types of circuit failures may be due to noise, improper resets or a partial power down, improper power up timing, human handling (but less than an ESD shock), and the result may include power supply droop and logic signal blips (a voltage dip or rise) that cause logic malfunctions. For example, a master/slave configuration may fail if the slave and the master were both set into a sending or both into a receiving mode by some anomalous event. In this example, if an event within the slave forced the slave to go into a power down mode without affecting the master, the master may never be aware of the malfunction. It would be advantageous to detect and recover to a normal operating status if this were to happen.

Often a failed circuit (even if the cause was an ESD event) is not permanently damaged. In such cases it would be advantageous to detect the failure and automatically recover to a normal circuit operation.

Others have addressed failures due to ESD events. For example, U.S. Pat. No. 6,658,597 ('597) senses an ESD event and specifically describes power up resetting of a microprocessor (and controllers) into a known state to ensure proper operation resumes. The '597 patent monitors power rails in the circuitry to detect ESD caused failures, and provides for automatic recovery therefrom. The '597 does not address non-ESD failures.

It is advantageous to recover from ESD events, but it would be advantageous to also detect and recover from non ESD event, e.g., power droops, and/or logic blips that do not rise to an ESD-type failure or failures due to some other external factors.

BRIEF DESCRIPTION OF THE DRAWINGS

The invention description below refers to the accompanying drawings, of which.

DETAILED DESCRIPTION OF AN ILLUSTRATIVE EMBODIMENT

The present invention may be illustrated using a master slave configuration where clock and data lines are monitored. However, the present invention may find advantageous applications in other circuit configuration where any particular contact point in the circuit may be monitored, an event detected, and, when ended, the circuit restored to normal operation regardless of the source of the event.

The present invention provides an interface that demonstrates three modes or states of operation. State 1 is a "power down" mode where the master may drive the outputs to a value equal to one of the power rails, typically Vdd. State 2 is a "wake up" mode where the master forces its outputs to the opposite state (typically ground) compared to the "power down" mode. State 3 is the normal state of operation.

Illustratively, the occurrence of a failure is detected and handled as a normal "power down/power up" is handled. The system goes into a power down State 1 where the "power up" sequence will allow the power supplies and signal lines to resume and/or recover to a controlled, known value that ensures the system attains a normal operating state.

The system discussed herein is a LVLS (low voltage low signal) system where the power supply is about +2.6V, and the normal clock and/or data signals are about 80 mV shown as item 1 riding at about 850 mV. However, other circuit types may benefit from application of the present invention.

Figure 1:
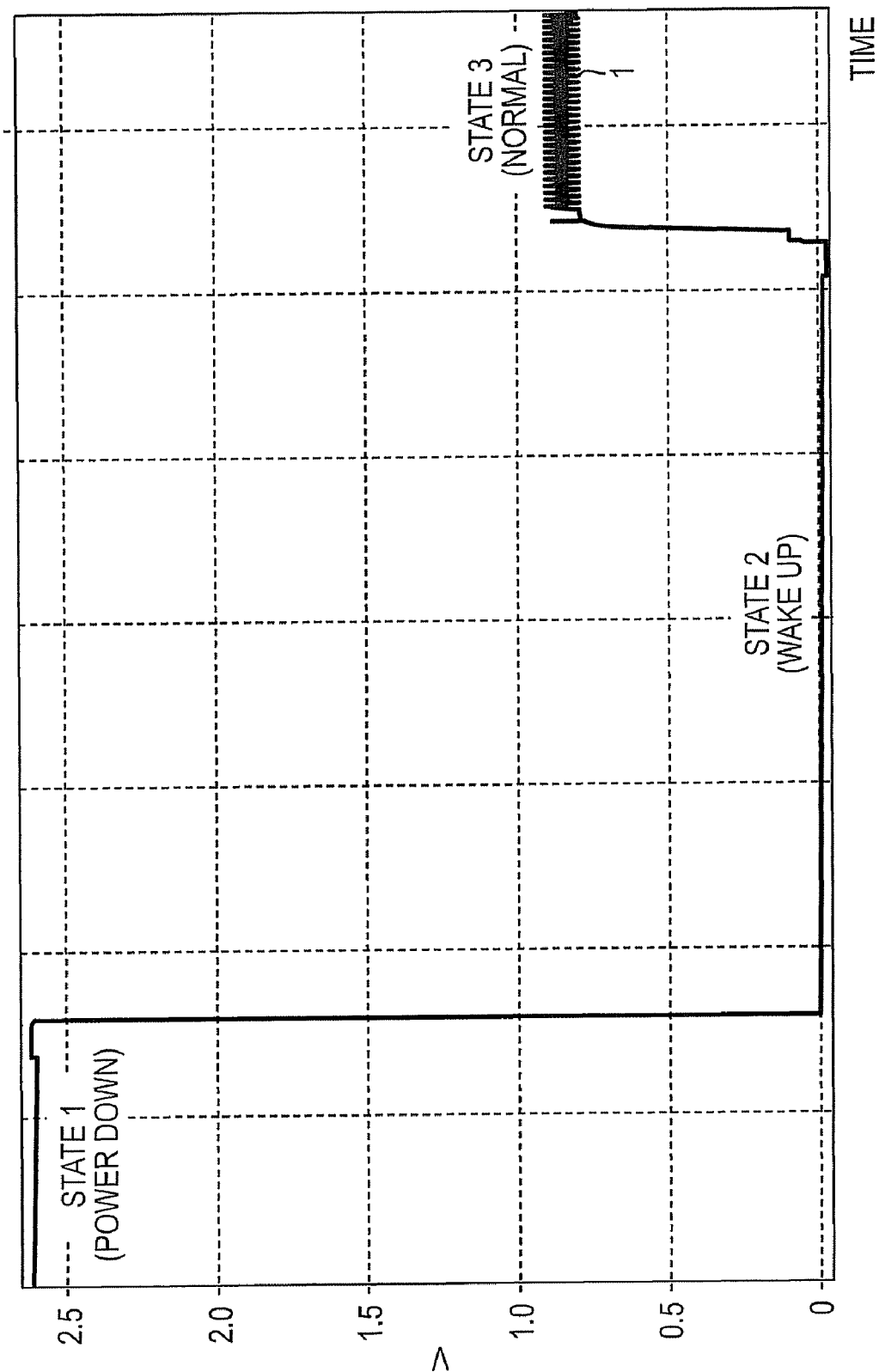
FIG. 1 is trace or graph illustrating three modes or state.

FIG. 1 illustrates the three modes. State 1, "power down," where a signal line goes to the +2.6V power rail, in State 2 the signal line goes to the "wake up" state at ground, and in State 3 the normal operating state wherein the signal (both clock and data) lines exhibit the 80 mV level at the 850 mV voltage level.

Although not discussed herein, the normal drivers and receiver circuits are typically differential circuits.

Figure 2:
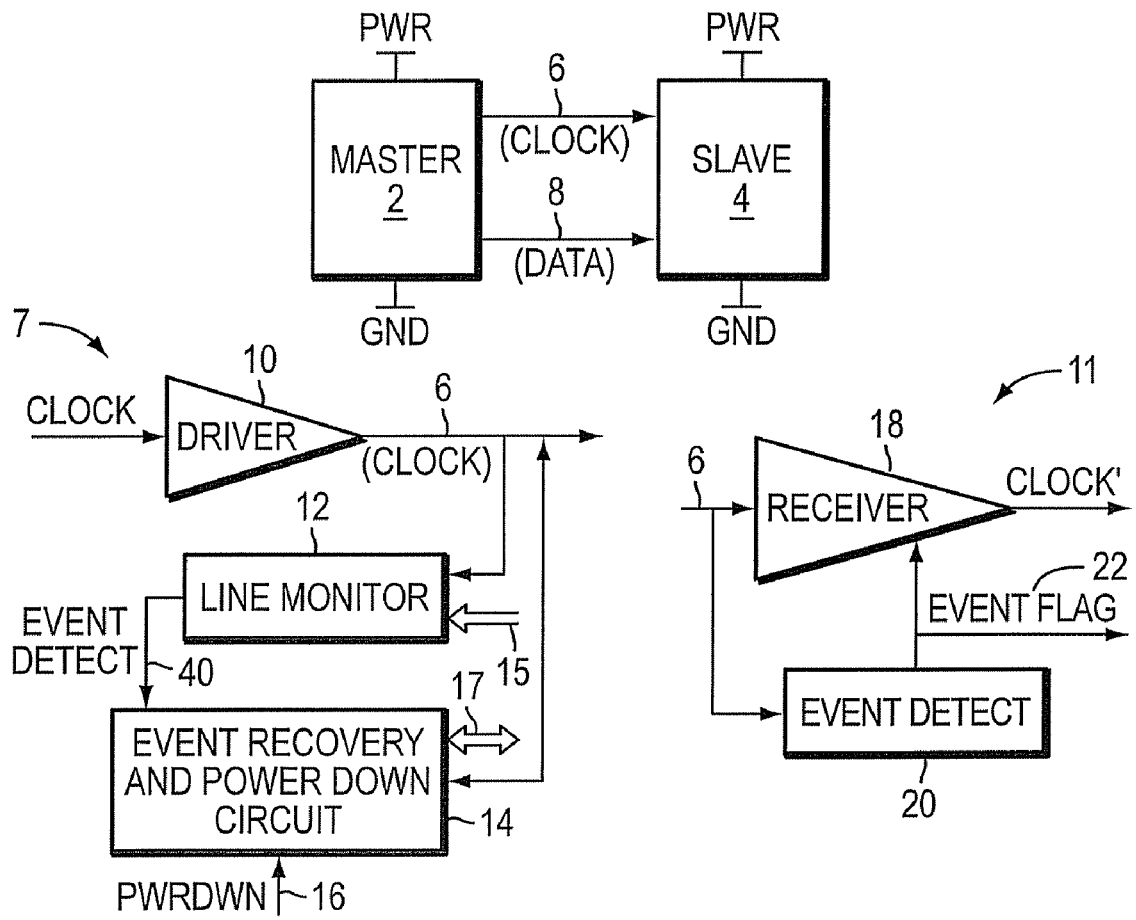
FIG. 2 is a schematic illustrating the present invention.

FIG. 2 illustrates a master circuit 2 connected to a slave circuit 4 via a clock line 6 and data lines 8. In this schematic, the directions of the arrows on lines 6 and 8 illustrate the master 2 sending data and clock to the slave. The slave 4 is only receiving the signals. This type of circuitry may be found in LVLS Serializer/Deserializers (SerDes) circuits. See the 80 mV logic signals riding at 850 mV in the normal State 3 in FIG. 1, and note that the logic signals do not traverse between the power supply voltage level and ground, but traverse from about 800 mV to about 900 mV. In such circuitry the present invention makes use of the ground and +Vdd (+2.6V) levels as indicators. That is, illustratively, when a clock, data or other monitored signal is driven to +2.6V or ground it signals that a failure has occurred and the system will try to recover and resume normal operation.

FIG. 2 shows a master 2 sending clock 6 and data 8 signals to a slave 4. In this example, a non-fatal, transient anomaly occurs on the clock 6 line. The anomaly is detected, the system responds and finally restores the system to normal operating status. At the master 2 a circuit 7 is shown. Illustratively, the driver 10 sends the LVLS clock signal 6 to the slave 4. A line monitor 12 monitors the clock line and detects a failure-type event. Again the failure may be due to an ESD event, but may also be due to noise, mis-handling, etc. The monitor 12 sends an EVENT DETECT signal 40 to an Event Recovery and Power Down Circuit (ERPD) 14. The ERPD circuit 14 may be used for the initial controlled powering up the master slave system. In this instance, the ERPD 14 circuit drives the clock line 6, illustratively to the power rail (+2.6V), to signal a circuit failure, and then drives the clock line 6, illustratively to ground (wake up), to signal that normal operation may resume.

On the slave side a circuit 11 includes a normal receiver 18 for the clock line 6. The Event Detector 20 responds to the 2.6V failure signal and the ground wake up signal. The Event Detect 20 outputs an Event Flag 22 that signals the slave controller circuitry (not shown) to resume normal operation. The Event Flag may operate with the controller (not shown) within the slave 4. For example, the Event Flag may go high when the clock line 6 goes to 2.6V indicating a failure at the master. The slave may then assume the power down operation. The event flag may go low for a delay time during the "wake up" period before the controller resumes normal operation.

Also note that the line monitor 12 may have additional inputs 15 from other lines, e.g., the data line or other signal lines that may be monitored for failures. Also the ERPD circuit may drive other outputs 17 that correspond to the other signals 15 monitored.

Figure 3:
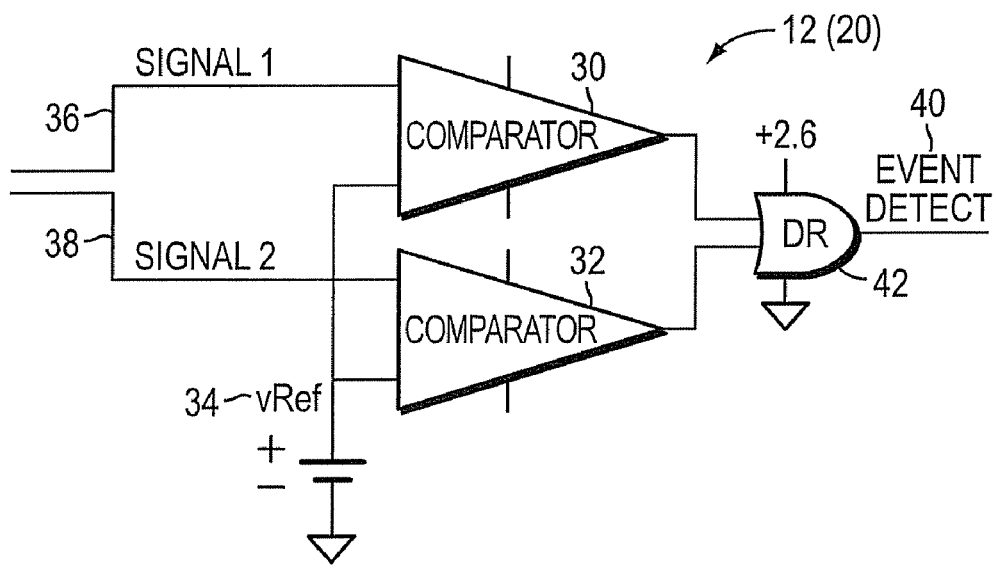
FIG. 3 is a schematic of a line monitor.

FIG. 3 illustrates a circuit implementing a line monitor 12 and the Event Detect 20 in the slave 4 of FIG. 2. Only the master 2 is described herein. Two comparators 30 and 32 each have one input tied to a reference voltage, Vref, 34 and the other input of each comparator to a signal line that is being monitored. For example signal 1, item 36, may be the clock line and signal 2, item 38, may be the data line. The outputs of the comparators are "OR'ed" 42 forming an output 40 that indicates an event is detected. In other embodiments other comparators may be added monitoring other signals, and some comparators may have their outputs tied directly together form an "OR" type (sometimes called a "wired or") logic function, rather than a multi-input "OR" gate.

When, for example, a positive voltage signal occurs on the signal 1 and/or signal 2 lines, items 36 and/or 38 will rise above Vref and the comparator(s) output (s)40 via the OR circuit 42 will output a signal, Event Detect, that a failure event occurred. Other comparators may be placed in parallel with 30 and 32 and their outputs OR'ed so that any failure will activate the Event Detect 40.

When the present invention is embodied for application to LVLS, master/slave systems, when a logic conflict between the master and the slave occurs, the clock and the data signal lines may rise to the +Vdd (+2.6V) level and be monitored as a failure by the circuits described herein.

Referring back to FIG. 2, the Event Detect circuit 20 at the slave 4 may be a comparator with one input tied to another Vref signal. This comparator will detect when the clock line 6 rises to +2.6V signifying that a failure has occurred. The Event Flag is set allowing the slave 4 to shut down in an ordered fashion. As discussed above, when the clock line 6 goes to ground the Event Flag can be used by the slave to resume normal operations in an orderly manner as might occur for a typical power up. The circuit discussed above refers to the clock 6, but parallel circuits may be employed for many other signals that may be monitored. Moreover, an OR circuit (not shown) may be used advantageously within the Event Detect 20 in a manner similar to that used within the Line Monitor 12.

Figure 4:
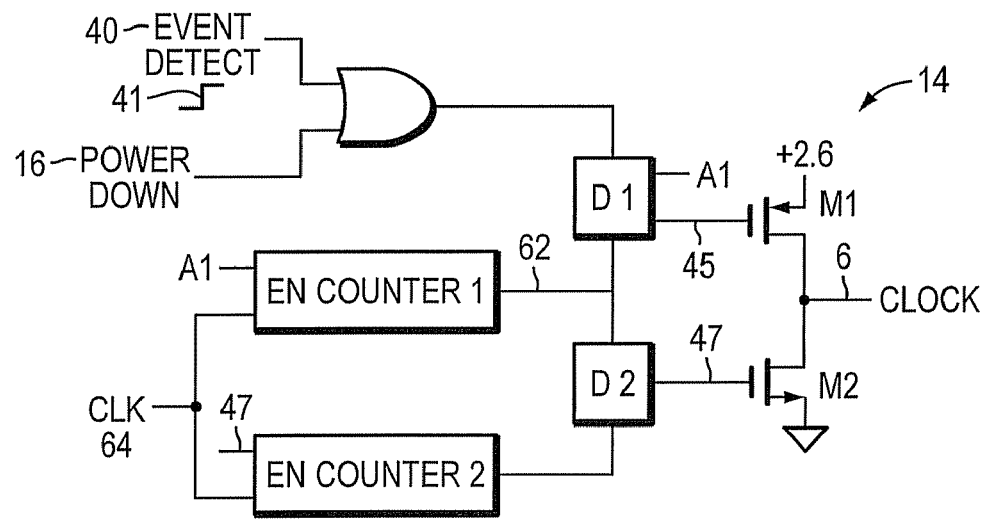
FIG. 4 is a schematic of an Event detect and Power Down circuit.

FIG. 4 illustrates a circuit illustrating some of the functions of the ERPD 14 circuit. The Event Detect 40 may be activated by the Line Monitor 12 detecting a failure, in this case on the 6 (clock) output, illustratively, going high 41. This signal travels through the OR gate 43 and sets the D1 flop. The Q– output 45 goes low turning on M1 wherein the clock 6 is driven to the +2.6 rail. As mentioned herein the slave 4 will recognize this signal as the beginning of a typical power down and restart cycle. Note that the POWER DOWN signal is input to the same OR gate 43 and will start the same sequence. Signal A1 going high enables the counter 1 to start counting CLK 64 pulses. After a given number of CLK pulses the counter 1 output a signal 62 that resets D1, off M1, and sets D2. The Q side of D2 47 goes high turning on M2, that in turn drives the clock 6 to ground. This ground signal the slave 4 to begin the "wake up" recovery stage. Signal 47 also enables counter 2 to count CLK pulses 64. After a given number of CLK 64 pulses are counted, counter 2 resets D2, that in turn turns off M2. At this point M1 and M2 are both off, the clock 6 signal is released and its level may be determined by other circuit components. FIG. 4 represents functional circuits but those skilled in the art will be able to make and use circuits that perform the same functions. In practice many different designs, including micro-processors, discrete logic, gate arrarys, etc. may be used in such designs.

The time duration of the power down signal is determined by the programmed counter 1 value and the duration of the wake up time is determined by the programmed counter 2 value. These programmed values allow the present invention to be advantageously employed in many applications and for many different signals. For example, clocks, data signals or other virtually any other signal may be monitored, and the duration of the power down and wake up periods may be made long enough to ensure the slave recognizes the wake up state and then resumes proper operation once the wake up state is released.

Figure 5:
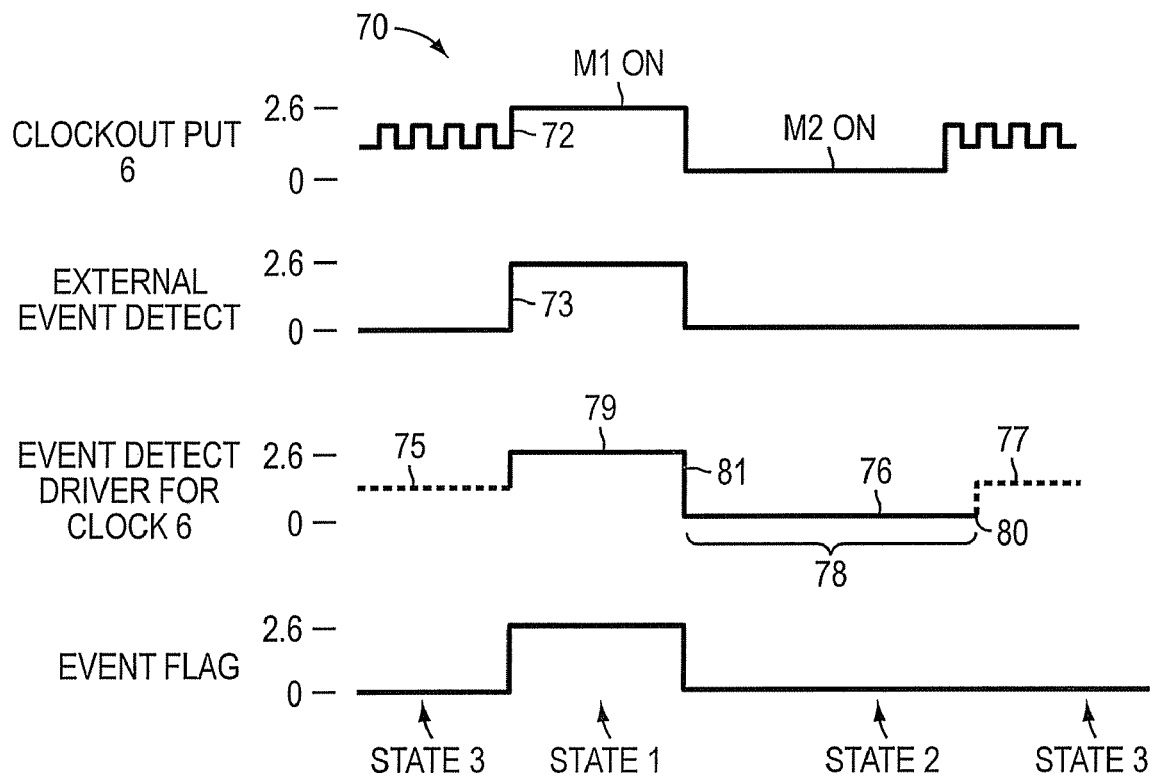
FIG. 5 is a trace or graph of the signals illustrating the invention.

FIG. 5 illustrates a driving the clock 6. In the normal state 70 a failure event occurs when the Clock 6 goes high 72. The External Event Detect signal 40 goes high 73, sets D1 in FIG. 4 and the Clock 6 is also driven high 79 via M1. At items 75 and 77, M1 and M2 are both off and the state of Clock 6 is determined by the other circuits. The slave 4 via the Event Detect 20 recognizes the event as it would a power down event. The slave 4, illustratively, uses the power down/power up sequence to ensure proper re-start from either an actual power down or an external failure.

After a programmable time M1 is turned off and M2 turned on. M2 drives the Clock 6 low 81. The slave recognizes this low as the "wake up" state of a power down cycle. After a programmable time 78 (counting clock signals) the ERPD circuit turn off M2 and releases 80 the Clock 6, and the slave resumes normal operation. The Event Detect 20 at the slave may also have a programmable time delay that is active during the "wake up" period. However, as known to those skilled in the art, other logic implementation may be used to advantage to achieve the same functions.

The Event Flag 22 may be arranged to go high 72 with the driver output and remain high until the driver is pulled low 76. When the slave sees the event flag go high 72, the slave may be programmed to see it as a normal power down cycle, and where the lowering of the Event Flag 78 as the "wake up" period. After a time delay 78 the slave resumes normal operations.

The detail logic implementation within the Recovery Logic 60 is within the skill of to the master.

What is claimed is:
1. Apparatus for detecting and recovering from external electrical disturbances, the apparatus comprising:
   a detector monitoring a signal line, power rail or ground; wherein when an electrical disturbance occurs the detector outputs an event detect signal;
   in response to which a driver forces the signal line to a first voltage which is maintained for;
   a first programmable time, after which the driver forces the signal line to a second voltage for;

a second programmable time, after which the signal line is released wherein the first voltage indicates a power down mode, the second voltage level indicates a wake up mode and the release of the signal line allows the apparatus to return to normal operation.

2. The apparatus of claim 1 wherein the signal line with a signal present defines a voltage range that is different from the first and the second voltage levels.

3. The apparatus of claim 1 wherein the signal line is a LVLS, the first voltage level is +2.6V and the third voltage level is ground.

4. The apparatus of claim 1 wherein the detector monitors a first signal line, and when an electrical disturbance occurs, the detector outputs an event detect signal to a driver that forces a second signal line to a first voltage.

5. The apparatus of claim 4 wherein first signal line is a power rail or ground line.

6. A method for detecting and recovering from external electrical disturbances, the method comprising the steps of:
   detecting a disturbance on a signal, power rail or ground line;
   driving the signal line from a first to a second voltage;
   detecting the second voltage as a power down signal;
   after a first time driving the signal line to a third voltage;
   detecting the third voltage as a wake up signal;
   after a second time allowing the voltage to return to its first voltage, then
   resuming normal operations.

7. The method of claim 6 further comprising the steps of differentiating between the first, second and third voltage levels.

* * * * *